United States Patent [19]
Hopkins

[11] 3,822,848
[45] July 9, 1974

[54] PROJECTION SCREEN HOLDER

[76] Inventor: Paul A. Hopkins, 2164 Sunset River Dr., Jacksonville, Fla. 32210

[22] Filed: May 18, 1971

[21] Appl. No.: 144,442

Related U.S. Application Data

[63] Continuation-in-part of Ser. No. 782,518, Dec. 10, 1968.

[52] U.S. Cl. ............................................. 248/279
[51] Int. Cl. .......................................... F16m 13/00
[58] Field of Search........ 248/54 CS, 123, 224, 279, 248/295, 297, 414; 160/189, 191

[56] References Cited
UNITED STATES PATENTS

| | | | |
|---|---|---|---|
| 707,880 | 8/1902 | Van Demark | 248/295 |
| 1,758,129 | 5/1930 | Shapiro | 248/414 |
| 1,807,760 | 6/1931 | Snow | 248/279 |
| 2,178,122 | 10/1939 | Ostler et al. | 248/52 CS |
| 2,750,142 | 6/1956 | McKee | 248/224 X |
| 2,793,687 | 5/1957 | Petrick | 160/24 |
| 2,816,453 | 12/1957 | Frank et al. | 248/1 X |

FOREIGN PATENTS OR APPLICATIONS

| | | | |
|---|---|---|---|
| 1,122,256 | 9/1954 | France | 248/279 |

Primary Examiner—William H. Schultz
Attorney, Agent, or Firm—Herbert M. Birch; Terrell C. Birch; Anthony L. Birch

[57] ABSTRACT

This invention relates to a picture screen holder of the wall mounted bracket type and provides for manual adjustment of the screen in a vertical angular as well as horizontal position by the operator or instructor standing in one position relative thereto and thus facilitates the unobstructed viewing of the picture screen by an audience and prevents any keystone or distortion effects of the picture produced by a projector.

7 Claims, 3 Drawing Figures

PATENTED JUL 9 1974   3,822,848
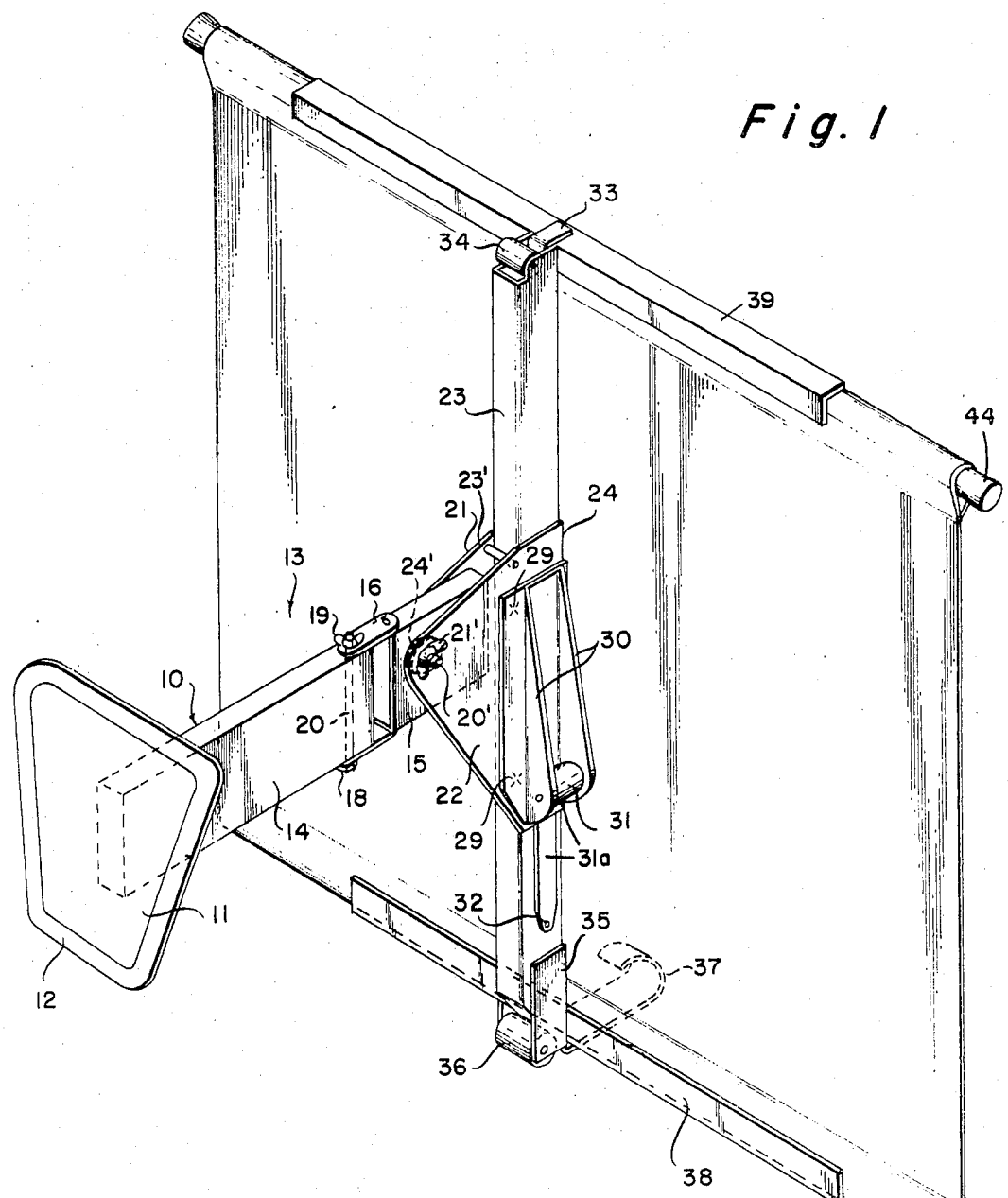
Fig. 1
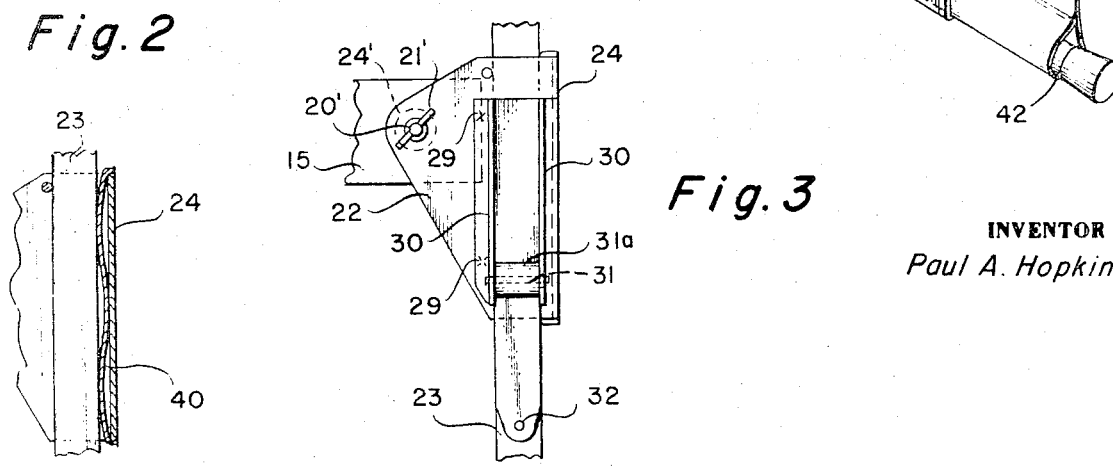
Fig. 2
Fig. 3
INVENTOR
Paul A. Hopkins

PROJECTION SCREEN HOLDER

This invention relates to improvements in projection screen holders and is a continuation-in-part of my copending application Ser. No. 782,518, filed Dec. 10, 1968.

This application is more particularly directed to the counter-balance spring structure for holding the projection screen and its support in any desired horizontal or vertical position with a minimum of manual effort on the part of an operator, more particularly to a novel universally adjustable wall mounted bracket support for such screens.

Projection picture screens are widely used in school classroom instruction and where limited space is frequently available. Some screens are frequently mounted on portable and foldable tripods as well as supports fixed to a wall or blackboard supported in front of the classroom or audience. All of these previous screen supports have inherent difficulties of lack of proper handling, space and adjustment of the equipment to properly and adequately present the subject to a class of students. One physical difficulty of maintaining the line of vision of all students assembled and frequently the inability of the instructor to keep out of the line of picture projection. Another practical objection to portable supports is the setting up of the apparatus as well as adjustment of the screen with a minimum of disturbance to the class.

One important object of the present invention is to provide a novel unitary wall mounted bracket support for holding a projection screen in a wider variety of positions and which shall be simple and rugged in construction and more efficient in operation to eliminate sunlight glare to a viewing audience, insure better and complete visibility from all angles by the viewer.

Another important object of the invention is to provide a screen support having ease of manipulation and adjustment by an instructor in front of a class with a minimum of disturbance and confusion of attention of the audience by any setting up of the apparatus.

Another object of the invention is to provide a single viewing screen wall bracket support which shall be angularly adjustable in a horizontal direction, as well as vertical, and tiltable horizontally to suit classroom requirements for proper picture viewing without keystone or distortion of picture effects.

Another object of the invention is to provide a single wall mounted screen bracket support which shall be structurally balanced so as to be manually adjusted in all positions with a minimum of effort by an operator.

Another object of the invention is the provision of plastic material, such as Nylon, in the adjustment points of the apparatus to provide lubrication requirements and minimize noise or rattling effects when adjusting the apparatus.

A further object of the invention is to provide a novel adjustable screen support which may be used with equal facility in combination with a horizontally located light projector or an overhead ceiling projector to reduce the keystoning effect or other distortion of the picture subject presented on the screen.

These and other objects of the invention will be more manifest from the following specification and drawings and specifically set forth in the appended claims.

In the drawings:

FIG. 1 is a perspective view of the bracket assembly support;

FIG. 2 is an enlarged fragmentary sectional view on line 2—2 of FIG. 1 showing a frictional drag and the support 12; and FIG. 3 is a fragmentary view of the coil spring motor and support.

Referring to FIGS. 1, 2 and 3 of the drawings there is shown a rigid tubular metal wall bracket arm 10 preferably made of a light steel tubing of rectangular cross-section to give the desired strength. One end of the tube 10 is rigidly attached to a conveniently located wall plate 11 in any suitable manner, as by welding, so as to form a single rigid bracket unit projecting at right angles from a room wall to rigidly and adjustably support a picture projection screen holder unit 12, as hereinafter more fully described.

The plate 11 is shaped in contour to fit an appropriate wall attached socket plate member 12 and these socket members may be conveniently located about a room for the most convenient screen viewing purposes and thus avoid the use of tripod arrangements usually employed for such portable screen holders.

The bracket arm 10 is preferably divided into two parts 14 and 15 and connected for horizontal angular movement by a hinge joint clamp provided by top and bottom connecting plates 16 – 17. Each of these plates is secured in position by welding at one end to the respective upper and lower side ends of the steel tubing 15. The free ends of the plates are connected by a vertically disposed hinge bolt 20 passing through the plate ends and the adjacent end of tube 14, as shown in FIG. 1. The bolt is secured by a head 18 and wing nut 19 to form an adjustable hinge clamp to hold the bracket parts 14 and 15 in a fixed adjusted horizontal angular relation. This arrangement is particularly desirable where the viewing screen holder 12 is located at the corner of a class room, for example, to better conserve space and enhance viewing.

The forward end of the adjustable arm section 15 mounts a generally U-shaped two-part rotatable metal plate connecting unit, one part including parallel plate leg members 21 and 22 forming a clamp for tiltably adjusting the viewing screen to eliminate keystone picture effect and with the forward end part closed to form a holding and guiding socket to provide independent vertical adjustment of the viewing screen relative to the supporting arm bracket 14 – 15 and the viewing audience.

The angular tilting adjustment of the screen is accomplished by clamping the plate legs 21 and 22 to the side faces of rectangular arm 15 by means of a threaded pivot bolt 20' passing through the assembly and a manually operated wing nut 21'. The forward end of the "U" is formed substantially rectangular in a shape indicated by the numeral 24. This construction provides a large and sturdy rectangular guide and retainer for freely supporting a screen holder standard 23. This screen holder standard fits slidably in the rectangular forward end 24 of the rotatable U-shaped metal plate connecting unit 23'.

I have discovered that the quiet and effective operation of metal to metal contact of friction or guide joint parts in this type of apparatus is enhanced by the use of a covering of plastic material, such as "Nylon" and which may be in the form of a coating, washer or sleeve located between the parts and is indicated by the numerals 24'. This plastic material at the contact points also serves as a lubricant for the clamped parts and thus reduce to a minimum any noise annoyance when operating the apparatus before an audience.

One of the important features of my invention is the novel manner of controlling the vertical and tilting movement of the viewing screen with a minimum manual effort. This operation is accomplished by the pivotally mounted holder guide 23' for the standard 23 slidable in the front portion 24 of the guide and the novel constant tension spring counterbalance also is mounted on the guide retainer or holder 23'. This counterbalancing tension spring 31a, see FIGS. 1 and 3, is carried by one side of the front portion 24 of the pivotally mounted guide 23' and is mounted around an arbor or shaft 31 extending between spaced legs or lugs 30 — 30 extending at right angles from a side of the front portion 24 of the standard guide 23'. The spring 31a is partially uncoiled to depend in single ply downward toward the lower end of the standard 23 and is secured to the side of the standard by suitable means, such as a rivet 32.

Thus when standard guide 23' and its guide front portion 24 are manipulated to slide upward or downward on the standard 23 the spring 31a winds or unwinds on the arbor 31 to counterbalance and aid with such sliding movement of the guide 23' and its front guide portion 24 on the standard 23.

Also, as shown in FIG. 2 the portion 24 is slightly spaced from the standard to house a flat flexible friction brake 40, as hereinafter noted. This operation is accomplished by the pivotally mounted holder guide 24 for the standard 23 and the novel constant tension counter-balance spring also mounted on the guide retainer or holder 24.

The counter-balance spring for counterbalancing the picture screen consists of a "U" shaped metal bracket having a base plate 30 secured thereto in any suitable manner as by welding indicated by the numerals 30 — 30 shown in FIGS. 1 and 3. The "U" shaped bracket has leg members which support a motor arbor 31 upon which a calibrated flat coil spring 31a is frictionally wound. The novel feature of this spring is that it is tempered or designed to be secured at one end to the picture screen standard 23 as indicated by the numeral 32 and free to rotate on the motor axle 31 which also serves as a spacer for the leg members 30 — 30. The counter-balance spring 31a exerts a constant tension on the screen regardless of the position of the wall bracket arm with respect to the position of the screen on the standard 23.

The screen is supported at the top of the standard by a hook shaped plate member 33 which also carries a projecting roller shaped cushion member 34 for protecting a wall from damage by careless manipulation. The picture screen may be mounted at each top and botom edge around tubular rods 42 and 44. The rods with the loop ends of the screen are cradled in angle bars 38 and 39 which are secured in the angle bars by suitable means, such as screws or by welding to the respective top and bottom hook plates 33 and 37. In the same manner the lower extremity of the standard 23 is provided with an adjustable slide extension plate member 35 for holding an angle bar cross member for engaging the screen edge and holding it taut whether it be in sheet or roll form.

This adjustable extension member also carries at its extremity a projecting cushion member 36 for protecting the screen damage against a wall or ceiling during any angular manipulation of the screen. This extension also mounts a suitable handle operating handle 37 as well as an angle bar screen holder indicated by the numeral 38.

During the manual manipulation of the screen by sliding standard 23 in the portion 24 of the wall mounted guide 23'there is provided on the guide front portion 24 the friction brake device indicated by the numeral 40 as shown in FIG. 2. This brake device is desirable since it prevents any drifting motion of the supporting standard 23.

The wall socket plate 12 may be mounted on a room wall at convenient locations and the bracket plate 11 slipped into place and the screen standard 23 adjusted to suit requirements for proper screen viewing vertically, horizontally or tiltably.

A summary of the operation and use of the present invention may be itemized under the following headings related to the most critical parts.

SLIDE STANDARD

The standard 23 permits vertical motion in the forward portion 24 of bracket 23' extending from the wall bracket 11 and the swivel part 15 of arm 10 to slide on the standard 23. For example, to move the standard down an operator pulls on handle 37. When the handle is released sliding standard 23 will stop and remain in such released position by suitable frictional engagement with the slidable telescopic connection between the leg portions of a U-shaped slide plate 35 and the free end of the standard 23 coupled therein by fastener 32. Thus the spring 31 is secured to standard 23 by fastener 32 at its depended end and acts as a counterbalance to the weight of the screen with its angle iron head frame structure, shown in FIG. 1. Added resistance to any likely drift in the portion 24 is provided by the flat spring means or friction brake 40, shown in FIG. 2.

TILT AND SCREEN POSITIONING

The screen head frame angle irons and rods, slide standard 23 and bracket arm pivot part 15 permits the slide standard to pivot angularly with respect to a wall parallel position approximately 90° and frictional resistance to any drift from a set tilt position is provided by the "Nylon" discs 24'.

SWIVEL ACTION

When tilted to various positions the screen, head frame angle iron members and slide standard may be set by wing nut 21' with respect to various angular adjustments other than 90° with respect to the wall at the base 11 of the bracket arm 10.

During such adjustment the rollers or cushion means 34 and 36 act as bumpers for the wall or ceiling.

SCREEN TENSION

The screen may be held under tension to maintain flatness for optimum visibility by the two angle bars 38 and 39 secured by suitable fastener means, not shown, or by welding to the hook plates 33 and 37. Tese hook plates clip over the opposite terminal ends of the slide standard 23 and are a part of the adjustable means 35 shown in FIG. 1. The adjustable extension means 35 is manually forced down and clamped to the lower end of the slide standard 23 to provide tension to the screen. Additional tension may be provided by more tightly seating the screen rods 42 and 44 in the angle irons 38 and 39 with screws or the like fasteners, if desired.

Various changes may be made in the construction of the screen holder without a parting from the invention as defined in the apended claims.

What I claim is:

1. In a projection screen supporting frame apparatus having a wall supported bracket arm with aligned bracket parts for holding the screen in a vertically or horizontally adjustable position,
   a. the improvement comprising a vertically disposed screen supporting standard engaging the sides of said frame;
   b. a substantially U-shaped plate guide and clamp unit having parallel leg members engaging the sides of said bracket arm of one of said bracket parts at one extremity thereof and slidably engaging said standard;
   c. a horizontally disposed pivot bolt passing through one of said bracket parts of the arm and said leg members of said unit;
   d. threaded nut means on said pivot belt adapted to draw said leg members together on said arm to form a clamp for regulating the horizontal tilting movement of said screen;
   e. a calibrated constant tension coiled spring counterbalance device mounted on said U-shaped guide, and means for connecting one end of said spring to said standard for counterbalancing the weight of said standard and the screen carried thereby,
   f. and including disc shaped plastic members interposed between the sides of one of said bracket parts of said arm and said guide leg members to form a horizontal pivot joint.

2. Apparatus of the character described in claim 1 including an elongated bow shaped leaf spring interposed between the end of the U-shaped guide to cushion the movement of said standard in said guide.

3. Apparatus of the character described in claim 1 including an adjustable slide plate secured at the lower extremity of said standard for securing and manipulating a roll screen of any desired length.

4. Apparatus of the character described in claim 3 including cushion means mounted at the upper extremity of said standard and at the lower extremity of said adjustable means for contacting a wall or ceiling during the manipulation of the standard.

5. Apparatus of the character described in claim 1 including means for adjusting the length of said standard to change the distance of the screen by the vertical spacing between the top and bottom screen holders whereby different length screens may be held.

6. Apparatus of the character described in claim 1 including a brake member carried by the guide and engaging said standard to control the drifting movement of said standard.

7. Apparatus of the character described in claim 1 including a plate member secured to one end of said bracket arm and a wall socket member formed to receive said plate member in rigid relation.

* * * * *

UNITED STATES PATENT OFFICE
CERTIFICATE OF CORRECTION

Patent No. 3,822,848          Dated July 9, 1974

Inventor(s) Paul A. Hopkins

It is certified that error appears in the above-identified patent and that said Letters Patent are hereby corrected as shown below:

Claim 1, line 16, change "belt" to --bolt--.

Signed and sealed this 24th day of September 1974.

(SEAL)
Attest:

McCOY M. GIBSON JR.          C. MARSHALL DANN
Attesting Officer            Commissioner of Patents